Dec. 15, 1959    R. B. BLIZARD    2,917,238
SATURABLE REACTOR COMPUTER
Filed March 10, 1955    2 Sheets-Sheet 1

*INVENTOR.*
ROBERT B. BLIZARD.
BY *Robert Hochfield*
HIS ATTORNEY.

Dec. 15, 1959  R. B. BLIZARD  2,917,238
SATURABLE REACTOR COMPUTER
Filed March 10, 1955  2 Sheets-Sheet 2

INVENTOR.
ROBERT B. BLIZARD.
BY Robert Hockfield
HIS ATTORNEY.

United States Patent Office 2,917,238
Patented Dec. 15, 1959

2,917,238

SATURABLE REACTOR COMPUTER

Robert B. Blizard, Stamford, Conn., assignor, by mesne assignments, to Schlumberger Well Surveying Corporation, Houston, Tex., a corporation of Texas Application March 10, 1955, Serial No. 493,380

10 Claims. (Cl. 235—194)

This invention relates to saturable reactors and, more particularly, pertains to new and improved saturable reactors which have particular utility as computing elements.

One of the problems which arises in automatic computations is that of deriving the reciprocal value of an independently variable quantity. Although there are systems for making this type of computation, these prior arrangements may not always provide a desired reliability in operation and many are very complex and expensive to construct.

It is an object of the present invention, therefore, to provide a new and improved saturable reactor which may be employed in making computations, such as the reciprocal value of an independently variable quantity, which is simple and inexpensive to construct.

Another object of the present invention is to provide a new and improved saturable reactor type computing system capable of reliably providing indications representing the reciprocal of an independently variable quantity.

Yet another object of the present invention is to provide a new and improved saturable reactor type computing system for obtaining the quotient of two independently variable quantities.

A further object of the present invention is to provide a new and improved saturable reactor which may be employed to obtain intermodulation signal components of two signal frequencies.

A still further object of the present invention is to provide a new and improved saturable reactor modulation circuit capable of deriving an output signal which is linearly proportional to one of the applied input signals.

A saturable reactor in accordance with the present invention comprises a core of ferromagnetic material saturable in response to an applied magnetizing force having an intensity greater than a given value, and means for applying to the core a magnetizing force including a component having a given orientation and an intensity greater than the given value. Inductor means is associated in magnetic relation with the core and has an effective magnetic axis disposed substantially transversely to the given orientation. Means are provided for deriving an electrical signal responsive to an inductive characteristic of the inductor means.

In a particular embodiment of the present invention, the inductor means is in the form of a single coil and indications are obtained of the self-inductance of the coil as a function of the intensity of the applied magnetizing force.

In accordance with another embodiment of the invention, the inductor means comprises a pair of coils and means are provided for deriving an electrical signal responsive to the mutual inductance between these coils.

The novel features of the present invention are set forth with particularity in the appended claims. The present invention, both as to its organization and manner of operation, together with further objects and advantages thereof, may best be understood by reference to the following description taken in connection with the accompanying drawings in which:

Figure 1:
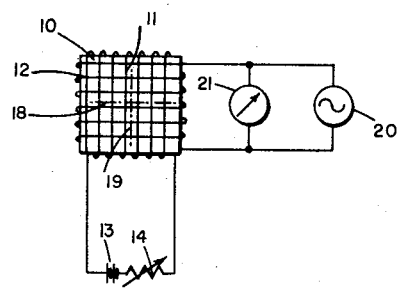
Fig. 1 is a schematic diagram of a saturable reactor embodying the present invention.

As shown in Fig. 1, a saturable reactor constructed in accordance with the present invention comprises a saturable core 10 wound with two coils 11 and 12 in space quadrature. It is to be noted that Fig. 1 is a schematic representation presented for the sake of simplicity in explaining the invention. Thus, core 10 is greatly simplified and does not include portions which close the magnetic loops.

Figure 2:
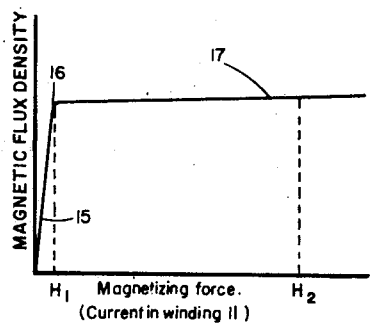
Fig. 2 is a graph representing an operating characteristic for the saturable reactor illustrated in Fig. 1.

Core 10 is constructed of a ferromagnetic material such as an alloy of nickel, cooper and iron, commonly referred to as Mu-metal, which exhibits a high permeability at low flux density so that it saturates easily and very nearly completely in response to an applied magnetizing force having an intensity greater than a given value. This characteristic may be evident in the graph of Fig. 2 which is a plot of magnetic flux density versus the resulting magnetizing force produced in core 10 by the current in winding 11.

In order to apply a magnetizing force to core 10, coil 11 is coupled to a source of unidirectional potential, such as a battery 13 provided with a current-regulating rheostat 14. The rheostat 14 may be adjusted to control current flow through coil 11 and thereby control the resulting magnetizing force. Thus, as the magnetizing force increases, the magnetic flux density increases nearly proportionately as illustrated by curve portion 15. However, at a magnetizing force $H_1$ the curve exhibits a sharp "knee" 16 and thereafter the magnetic flux density remains substantially constant as the magnetizing force is increased from the value $H_1$ to a greater magnetizing force $H_2$, as illustrated by curve portion 17. The resulting magnetizing force includes a component aligned with the magnetic axis of coil 11 having an orientation represented by horizontal broken line 18. Its intensity is always greater than the saturation value, $H_1$, represented on the graph in Fig. 2.

The magnetic axis of coil 12 is represented by vertical broken line 19 and thus this coil constitutes inductor means associated in magnetic relation with core 10 and having an effective magnetic axis disposed substantially transversely to the component of magnetizing force produced by coil 11 and denoted by broken line 18. To derive an electrical signal responsive to an inductance characteristic of inductor means 12, a source of alternating potential 20 provides a constant current at the terminals of this coil and an alternating current voltmeter 21 is coupled to the coil. Accordingly, neglecting the resistance of coil 12, meter 21 provides indications of the self-inductance of coil 12.

Figure 3:
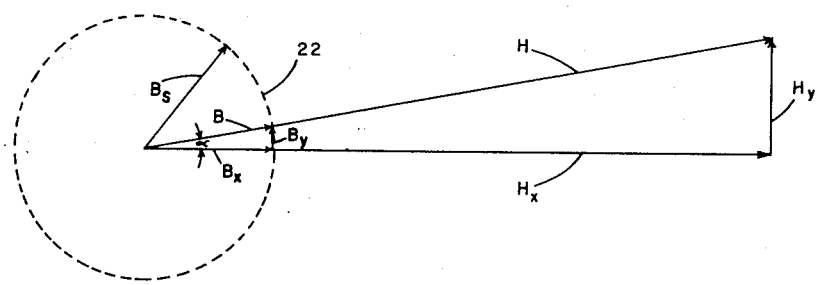
Fig. 3 is a vector diagram useful in explaining the operation of the saturable reactor shown in Fig. 1.

In explaining the operation of the circuit just described, occasional reference will be made to Fig. 3 which is a space vector diagram representing the magnetizing force and magnetic flux conditions in core 10. If the current, $I_x$, in winding 11 saturates core 10, it will now be shown that within limits the inductance of coil 12 is inversely proportional to this current, $I_x$. In Fig. 3, the horizontal vector, $H_x$, in the direction of axis 18 represents the magnetizing force due to $I_x$, to which it is proportional. Any current in coil 12 produces the magnetizing force $H_y$ in the direction of axis 19 which is at right angles to $H_x$ and the resultant magnetizing force is represented by the vector H.

If the material in core 10 is substantially isotropic, the flux density vector B is colinear with magnetizing force vector H, and as long as H is large enough to produce saturation of the core, the magnitude of B is independent of H and is equal to the saturation flux density characterized by the broken-line circle of radius $B_s$. In other words, circle 22 is the locus of the magnetic flux density vector when core 10 is saturated. The angle, $\alpha$, between vectors B and $H_x$ is given by:

$$\alpha = \arctan H_y/H_x \quad (1)$$

and the y component of flux density $B_y$ is:

$$B_y = B \sin \alpha \quad (2)$$

For $H_y/H_x$ less than 0.13 there is less than 1% error in the relationship $$B_y/H_y = B_s/H_x \quad (2)$$

The ratio $B_y/H_y$ represents the effective permeability of the core in the direction of axis 19 and thus the inductance of winding 12 is proportional to $1/H_x$. Since, as pointed out above, $H_x$ is proportional to $I_x$, the inductance L of winding 12 is inversely proportional to the current in winding 11, or $$L = K/I_x \quad (4)$$

where K is a constant determined by the properties of core 10 and the number of turns in windings 11 and 12.

As is well known, by supplying a constant current to an inductance, the resulting voltage across the inductance is representative of its self-inductance. Consequently, the voltage indicated by meter 21 is accurately representative of the inductance of coil 12. If rheostat 14 is manipulated to provide a current in winding 11 representing an independently variable quantity, meter 21 provides indications representing the reciprocal of this independently variable quantity.

A practical core arrangement to make use of the principle explained above is show in Fig. 4. It comprises a core 25 of ferromagnetic material including an essentially O-shaped portion 26 of generally square outline having diametrically opposed sections 27 and 28 saturable in response to an applied magnetizing force having an intensity greater than a given value. Core 25 further includes an essentially C-shaped portion 29 having opposite ends 30 and 31 thereof integral with, and thereby magnetically coupled to, opposed sections 27 and 28. The core also includes a leg portion 32 extending across O-shaped portion 26 and effectively bridging opposed sections 27 and 28. The core may, for example, be constructed of a stack of laminations suitably arranged to provide the configuration illustrated in Fig. 4.

A first coil 33 is wound on a part 34 of O-shaped portion 26 intermediate opposed sections 27 and 28 and a battery 35, provided with an adjusting rheostat 36, is connected to coil 33. Thus, means are provided for supplying current to coil 33 to derive magnetizing forces in each of sections 27 and 28 oriented along broken lines 37 and 38, respectively. The current supplied to coil 33, of course, is great enough so that the intensity of each of these magnetizing forces is greater than the saturation value for core sections 27 and 28.

A second coil 39 is wound on a part 40 of the C-shaped portion 29 of core 25. Part 40 is integral with the end portions 30 and 31 of portion 29 and therefore the effective magnetic axis for coil 39 in each of opposed sections 27 and 28 is disposed along respective broken lines 41 and 42 which are substantially perpendicular to the respective orientations represented by lines 37 and 38.

A source 43 of alternating potential is coupled to coil 39 and provides current of constant amplitude. An alternating current voltmeter 44, also coupled to the coil, provides indications in response to the self-inductance of coil 39.

In operation, the saturable reactor illustrated in Fig. 4 may be employed to effect computations in essentially the same manner explained in connection with the device illustrated in Fig. 1. Thus, if rheostat 36 is adjusted to provide a current in coil 33 representing an independently variable quantity, meter 44 provides indications representing the reciprocal of the independently variably quantity.

Figure 4:
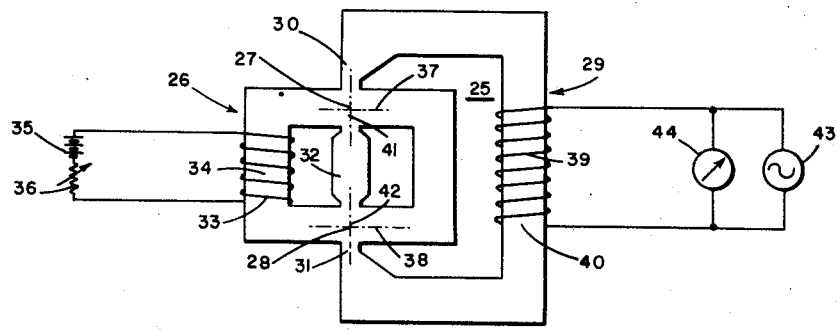
Figs. 4 and 5 represent practical embodiments of the saturable reactor of Fig. 1.
Figure 5:
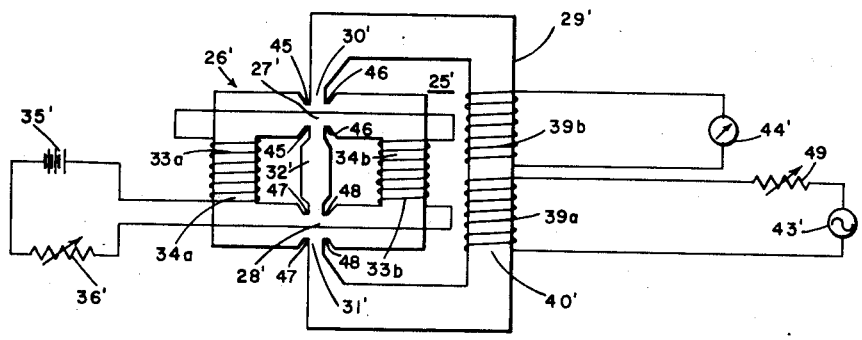

The device illustrated in Fig. 4 may be further modified in the manner shown in Fig. 5. In Fig. 5, elements which correspond to similar ones in Fig. 4 are represented by the same reference numerals followed by a prime designation.

In order to minimize the flux which appears in C-shaped portion 29' of core 25' due to the current from source 35', the first coil is divided into a pair of coils 33a and 33b, each wound on a respective one of diametrically opposed parts 34a and 34b of the O-shaped portion 26' of core 25'. Coils 33a and 33b are energized by source 35' so that magnetic forces in aiding relationship are derived in each of sections 27' and 28' to provide resultant magnetizing forces which saturate these core sections.

In addition, to minimize the effects of bulging of the saturating flux due to current in coils 33a and 33b into C-shaped portion 29' of core 25' at the intersections of ends 30' and 31' with sections 27' and 28', the cross sectional area of the O-shaped portion is reduced at locations 45, 46, 47 and 48, while the remainder of the O-shaped portion is retained at a given cross sectional size, or made even larger. This constructional feature prevents the flux density from being lower at the intersections between core portions 29' and 32' than in the rest of the magnetic loop of portion 26'. To further minimize the effects of flux bulging, end portions 30' and 31' and the ends of leg 32' are of reduced cross sectional areas compared to O-shaped portion 26'.

Two mutually coupled coils, 39a and 39b, are wound on portion 40' of core 25'. One of these coils, 39a, serves as a primary winding and is connected to a source 43' of alternating current provided with an adjusting rheostat 49. The other winding 39b functions as a secondary and is connected to an alternating potential voltmeter 44'.

Using essentially the same analysis presented in connection with Fig. 1, it may be seen that the mutual inductance between windings 39a and 39b is proportional to the reciprocal of current $I_x$ in windings 33a and 33b. This is indicated by meter 44'. In addition, the voltage at winding 39b is proportional to the current, $I_2$, in winding 39a which may be adjusted by rheostat 49. In other words, the voltage, E, indicated by meter 44' represents:

$$E = \frac{j\omega K I_2}{I_x} \quad (5)$$

where K is a constant defined for Equation 4. Thus, if rheostats 36' and 49 are adjusted in accordance with two independently variable quantities, meter 44' indicates their quotient.

Figure 6:
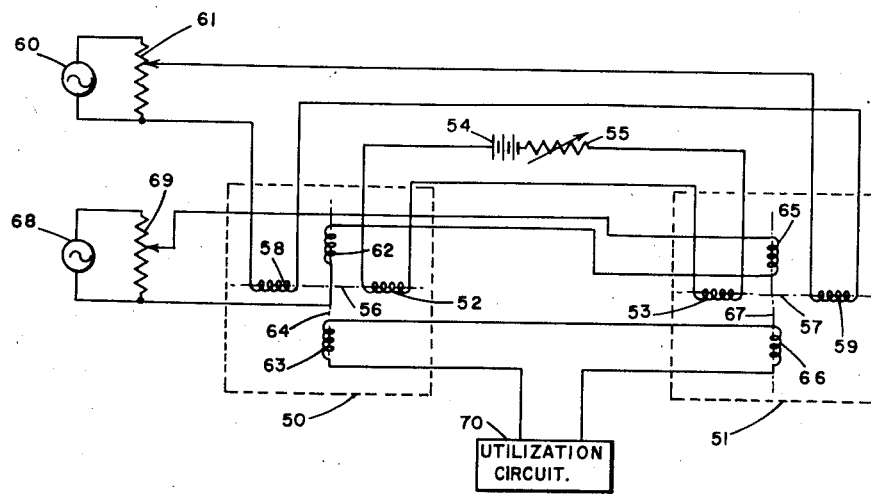
Fig. 6 is a schematic diagram of another embodiment of the present invention.

In the embodiment of the invention illustrated in Fig. 6, a pair of cores are employed. These may be the type shown in Fig. 5, but for the sake of simplicity have been represented schematically by the broken line rectangles 50 and 51. The cores 50 and 51 are provided with respective saturating windings 52 and 53 energized by a source 54 of unidirectional potential provided with a current-adjusting rheostat 55. The current in windings 52 and 53 provides respective magnetizing forces in cores 50 and 51 that are directed along axes 56 and 57 and the magnitude of this current is adjusted so that the magnetizing force is above the saturation intensity, and preferably is at a point intermediate the values $H_1$ and $H_2$ represented in the graph of Fig. 2.

Each of the cores 50 and 51 is provided with a respective one of control windings 58 and 59 having their magnetic axes aligned with the axes 56 and 57 and energized in opposite polarity senses by a source of alternating potential 60 having a given frequency. To adjust the current in the coils 58 and 59, a potentiometer 61 is provided.

Core 50 is provided with a pair of mutually coupled windings 62 and 63 having their magnetic axes defined by a broken line 64 oriented perpendicularly to axis 56. Similarly, core 51 is provided with a pair of mutually coupled windings 65 and 66 having their magnetic axes represented by a broken line 67 disposed perpendicularly to axis line 57. Coils 62 and 65 are energized in opposite polarity sense by a source 68 of alternating potential having a predetermined frequency and a potentiometer 69 is provided to adjust the current supplied to these coils.

Coils 63 and 66 are coupled to a utilization circuit 70 which may be arranged to make use of the intermodulation products of the two frequencies supplied by sources 60 and 68 in an application in which the saturable reactor of Fig. 6 is employed as a linear modulator.

In describing the operation of the circuit shown in Fig. 6, it is assumed that the voltage supplied by source 68 is $e_i$, that it is to be modulated by a current $I_m$ supplied by source 60 and that winding resistances may be neglected. As the current $I_m$ increases the magnetizing force in inductance 58, it decreases the magnetizing force in inductance 59 and vice versa. The coils 63 and 66, which may be designated secondary windings, are connected to circuit 70 in such a way that their signals oppose each other, and when $I_m$ is equal to zero, the output voltage $e_o$ appearing at utilization circuit 70 is also zero. It is also assumed that the resistance of the windings may be neglected and that for the sake of simplicity of the explanation the number of turns in windings 52 and 58, and 53 and 59, respectively, is the same. It will be shown that the transfer function $e_o/e_i$ is proportional to $I_m$ provided that the inductance of the windings 62 and 65 is proportional to $1/(I_o+I_m)$ and $1/(I_o-I_m)$, respectively, where $I_o$ is the current in windings 52 and 53.

If $L_1$ and $L_2$ are the respective inductances of the primary coils 62 and 65 and $M_1$ and $M_2$ are the mutual inductances between coils 62 and 63, and 65 and 66, respectively, from the reciprocal relationship between control current and inductance expressed in Equation 4 above, it follows that:

$$1/L_1 = A(I_o+I_m) \quad (6)$$
$$1/L_2 = A(I_o-I_m) \quad (7)$$
$$1/M_1 = B(I_o+I_m) \quad (8)$$
$$1/M_2 = B(I_o-I_m) \quad (9)$$

where A and B are constants of the system.

The current in windings 62 and 65 is given by:

$$I_i = e_i/j\omega(L_1+L_2) \quad (10)$$

and the output voltage is given by:

$$e_o = I_i j\omega(M_1-M_2) \quad (11)$$

Combining Equations 9 and 10 yields:

$$e_o/e_i = \frac{M_1-M_2}{L_1+L_2} \quad (12)$$

From Equations 6 through 9, it is possible to rewrite Equation 12 as follows:

$$e_o/e_i = -\left(\frac{A}{B}\right)\left(\frac{I_m}{I_o}\right) \quad (13)$$

From Equation 13 it may be seen that within the stated limitations $e_o/e_i$ is proportional to $I_m$.

It is also apparent from Equation 13 that the output voltage, $e_o$, is the product of input voltage, $e_i$, and input current, $I_m$. Consequently, intermodulation products are developed, in a well-known manner, and the circuit illustrated in Fig. 6 may be employed as a linear modulator.

In addition, since the output voltage is proportional to the product of the input current $I_m$ and input voltage $e_i$, the device may be employed to provide computations representing the product of two independently variable quantities.

If desired, the core employed in a saturable reactor embodying the present invention may be of hollow toroidal form (not shown). In this case the saturating winding (as winding 11 in Fig. 1) may be wound uniformly about the toroid and the other winding (as winding 12 in Fig. 1) may be wound within the hollow of the toroid. Of course, the windings may be interchanged. In either event, the entire toroidal core then becomes the saturating section and the device operates in the manner described hereinbefore.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. A saturable reactor comprising: a core of ferromagnetic material saturable in response to an applied magnetizing force having an intensity greater than a given value; means for applying to said core a predetermined magnetizing force producing saturation of said core in a given direction and for applying to said core a further variable magnetizing force which does not decrease the total magnetizing force in the given direction below said given value; inductor means associated in magnetic relation with said core and having an effective magnetic axis disposed substantially transversely to said given direction; and means for deriving an electrical signal responsive to an inductance characteristic of said inductor means which represents the reciprocal of said magnetizing forces.

2. A saturable reactor comprising: a core of ferromagnetic material saturable in response to an applied magnetizing force having an intensity greater than a given value; first inductor means associated in magnetic relation to said core and having an effective magnetic axis disposed in a given direction relative to said core; means for supplying a predetermined electric current to said first inductor means producing saturation of said core in said given direction and for supplying to said first inductor means a further variable electric current which does not decrease the total magnetizing force in the given direction below said given value; second inductor means associated in magnetic relation with said core and having an effective magnetic axis disposed substantially transversely to said given direction; and means for obtaining indications responsive to an inductance characteristic of said second inductor means representing the reciprocal of said electric currents.

3. A saturable reactor comprising: a core of ferromagnetic material including an essentially O-shaped portion having diametrically opposed sections saturable in response to an applied magnetizing force having an intensity greater than a given value, an essentially C-shaped portion having opposite ends thereof magnetically coupled to said opposed sections, and a leg portion extending across said O-shaped portion and bridging said opposed sections; a first coil wound on at least part of said O-shaped portion of said core; means for supplying a predetermined electric current to said first coil producing saturation of said core in a given direction in each of said opposed sections and for supplying to said first coil a further variable electric current which does not decrease the total magnetizing force in the given direction below said given value; a second coil wound on at least part of said C-shaped portion of said core and thereby having an effective magnetic axis in each of said opposed sections disposed substantially transversely to said given direction; and means for obtaining indications responsive to an inductance characteristic of said second coil representing the reciprocal of said electric currents.

4. A computing system comprising: a core of ferromagnetic material saturable in response to an applied magnetizing force having an intensity greater than a given value; means for applying to said core a predetermined magnetizing force producing saturation of said core in a given direction and for applying to said core a further magnetizing force in response to an independently variable quantity which does not decrease the total magnetizing force in the given direction below said given value; inductor means associated in magnetic relation with said core and having an effective magnetic axis disposed substantially transversely to said given direction; and means responsive to an inductance characteristic of said inductor means for obtaining indications representing the reciprocal of said independently variable quantity.

5. A computing system comprising: a core of ferromagnetic material saturable in response to an applied magnetizing force having an intensity greater than a given value; means for applying to said core a predetermined magnetizing force producing saturation of said core in a given direction and for applying to said core a further magnetizing force in response to an independently variable quantity which does not decrease the total magnetizing force in the given direction below said given value; a coil associated in magnetic relation with said core and having an effective magnetic axis disposed substantially transversely to said given direction; and means responsive to the self-inductance of said coil for obtaining indications representing the reciprocal of said independently variable quantity.

6. A computing system comprising: a core of ferromagnetic material includuing an essentially O-shaped portion having diametrically opposed sections saturable in response to an applied magnetizing force having an intensity greater than a given value; an essentially C-shaped portion having opposite ends thereof magnetically coupled to said opposed sections and a leg portion extending across said O-shaped portion and bridging said opposed sections; a first coil including a pair of portions, each wound on a respective one of diametrically opposed parts of said O-shaped portion of said core intermediate said opposed sections; means for supplying a predetermined electric current to said portions of said first coil to derive magnetizing forces in magnetic aiding relationship producing saturation of said core in a given direction in each of said opposed sections and for supplying to said first coil portions a further magnetizing force in response to an independently variable quantity which does not decrease the total magnetizing force in the given direction below said given value; a second coil wound on at least part of said C-shaped portion of said core and thereby having an effective magnetic axis in each of said opposed sections disposed substantially transversely to said given direction; and means responsive to the self-inductance of said second coil for obtaining indications representing the reciprocal of said independently variable quantity.

7. A saturable reactor comprising: a core of ferromagnetic material saturable in response to an applied magnetizing force having an intensity greater than a given value; means for applying to said core a predetermined magnetizing force producing saturation of said core in a given direction and for applying to said core a further variable magnetizing force which does not decrease the total magnetizing force in the given direction below said given value; a pair of mutually coupled coils associated in magnetic relation with said core and having effective magnetic axes disposed substantially transversely to said given direction and means for deriving an electrical signal responsive to the mutual inductance between said pair of coils which represents the reciprocal of said magnetizing forces.

8. A saturable reactor comprising: first and second cores of ferromagnetic material saturable in response to an applied magnetizing force having an intensity greater than a given value; means for applying to each of said first and said second cores a magnetizing force including a component having a given orientation and an intensity alternating at a selected frequency and having an average value greater than said given value; two pairs of mutually coupled coils, each pair associated in magnetic relation with one of said first and said second cores and having effective magnetic axes disposed substantially transversely to said given orientation; means for supplying current of predetermined frequency to one of each of said pairs of mutually coupled coils; and a utilization circuit electrically connected to the remaining of said pairs of coils for deriving intermodulation signal components of said given and predetermined frequencies.

9. A computing system comprising: a core of ferromagnetic material saturable in response to an applied magnetizing force having an intensity greater than a given value; means for applying to said core a predetermined magnetizing force producing saturation of said core in a given direction and for applying to said core a further magnetizing force in response to an independently variable quantity which does not decrease the total magnetizing force in the given direction below said given value; a pair of mutually coupled coils associated in magnetic relation with said core and having effective magnetic axes disposed substantially transversely to said given direction, and means responsive to the mutual inductance between said pair of coils for obtaining indications representing the reciprocal of said independently variable quantity.

10. A computing system comprising: first and second cores of ferromagnetic material saturable in response to an applied magnetizing force having an intensity greater than a given value; coil means associated in magnetic relation with each of a corresponding one of said cores and having an effective magnetic axis disposed in a given direction relative to said core; means for supplying an electric current variable in response to one independently variable quantity to said coil means to provide a resultant magnetizing force having an intensity variable in a range of values greater than said given value; two pairs of mutually coupled coils, each pair associated in magnetic relation with one of said first and said second cores and having effective magnetic axes disposed substantially transversely to said given direction; means for supplying an electric current variable in response to another independently variable quantity to one of each of said pairs of mutually coupled coils; and means coupled to the remaining of each of said pairs of mutually coupled coils for obtaining indications representing the product of said independently variable quantities.

References Cited in the file of this patent
UNITED STATES PATENTS

| | | |
|---|---|---|
| 720,884 | Burgess et al. | Feb. 17, 1903 |
| 1,287,982 | Hartley | Dec. 17, 1918 |
| 1,504,882 | Elmen | Aug. 12, 1924 |
| 2,700,703 | Nordyke | Jan. 25, 1955 |

OTHER REFERENCES

Saturating Core Devices (Crow), published by The Scientific Book Publishing Co., 530 South 4th Street, Vincennes, Indiana, 1949, pages 171–177.

Nondestructive Sensing of Magnetic Cores (Buck and Frank), Communication and Electronics, January 1954, pages 822–830.